US 9,104,441 B2

(12) United States Patent
Cornwall et al.

(10) Patent No.: US 9,104,441 B2
(45) Date of Patent: Aug. 11, 2015

(54) CONTEXT AND APPLICATION AWARE SELECTORS

(75) Inventors: Kevin Cornwall, Saffron Walden (GB); Jeffrey G. Gartner, Hopewell Junction, NY (US); Jason Tanabe, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 674 days.

(21) Appl. No.: 13/249,547

(22) Filed: Sep. 30, 2011

(65) Prior Publication Data
US 2013/0086597 A1 Apr. 4, 2013

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |

(52) U.S. Cl.
CPC .................................. *G06F 9/4443* (2013.01)

(58) Field of Classification Search
None
See application file for complete search history.

(56) References Cited

U.S. PATENT DOCUMENTS

| | | | |
|---|---|---|---|
| 7,546,298 B2 | 6/2009 | Hulai et al. | |
| D664,150 S | 7/2012 | Boyer et al. | |
| D664,551 S | 7/2012 | Bukauskas et al. | |
| D669,088 S | 10/2012 | Boyer et al. | |
| D678,305 S | 3/2013 | Bukauskas et al. | |
| 2005/0166215 A1 * | 7/2005 | Holloway et al. | 719/329 |
| 2007/0106951 A1 * | 5/2007 | McCormack et al. | 715/764 |
| 2008/0313650 A1 * | 12/2008 | Arnquist et al. | 719/316 |
| 2010/0043017 A1 * | 2/2010 | Paul et al. | 719/328 |
| 2010/0115434 A1 * | 5/2010 | Yagi et al. | 715/763 |
| 2010/0246800 A1 | 9/2010 | Geppert et al. | |
| 2010/0251124 A1 | 9/2010 | Geppert et al. | |
| 2010/0251142 A1 | 9/2010 | Geppert et al. | |
| 2010/0251158 A1 | 9/2010 | Geppert et al. | |
| 2010/0318989 A1 | 12/2010 | Dureau et al. | |
| 2011/0047246 A1 | 2/2011 | Frissora et al. | |
| 2011/0047501 A1 | 2/2011 | Mohler | |
| 2011/0302499 A1 | 12/2011 | Chou et al. | |

FOREIGN PATENT DOCUMENTS

| | | |
|---|---|---|
| WO | WO 02/37311 | 5/2002 |
| WO | WO 02/073493 | 9/2002 |

OTHER PUBLICATIONS

Schmidt et al. "There is more to Context than Location: Environment Sensing Technologies for Adaptive Mobile User Interfaces," Proceedings of the International Workshop on Interactive Applications of Mobile Computing (IMC98), Nov. 1998, Rostock, Germany, 5 pages [retrieved from: httpP//www.teco.edu/~albrecht/publication/imc98.ps].

(Continued)

*Primary Examiner* — Emerson Puente
*Assistant Examiner* — Kacy Verdi
(74) *Attorney, Agent, or Firm* — Sheridan Ross P.C.

(57) ABSTRACT

The middleware presented herein maps a plurality of application user interfaces to a single user experience (i.e. user interface) so that a user is more comfortable with how information is presented. The middleware maps key elements of an original user interface into a standard user interface on a user's device. When a user interface is mapped, information or data is taken from the original user interface and is reconfigured to create the standard user interface displayed to the user. In embodiments, the middleware receives data associated with a user interface for an application, interprets the received data, parses the data, translates the parsed data by determining the correct template map and mapping the parsed data to a standard user interface, and configures the standard user interface with the translated data.

18 Claims, 14 Drawing Sheets

(56) References Cited

OTHER PUBLICATIONS

Website "SUPPLE: Automatic Generation of Personalizable User Interfaces," University of Washington Department of Computer Science & Engineering, Aug. 2009, 5 pages [retrieved from: http://www.cs.washington.edu/ai/supple/].

Extended Search Report for European Patent Application No. 12185773.4, dated Jan. 12, 2015 6 pages.

* cited by examiner

CONTEXT AND APPLICATION AWARE SELECTORS

BACKGROUND

Computers are ubiquitous, and each application running on a computer, generally, has its own look and feel. Some interfaces are well thought out and user-friendly; other interfaces can frustrate the user or customer. This frustration may lead to dissatisfied customers and lost business opportunities. For example, some websites allow small amounts of customer personalization, such as saved customer information and email reminders, while other websites do not allow personalization.

Unfortunately, user interfaces are locked to each application, some good and some bad, rather than adapting the user interface (UI) to the customer's needs. A user may be more comfortable or accustomed to one or more UIs; however, these UI's may only be used with a few applications.

Typically user interfaces do not consider the context of the user when displaying information to the user, nor do the UIs change depending on the context of the transaction. Additionally, many UIs do not consider the application state; therefore, details about the happenings within the application are ignored and often cause the user to flip between application windows to obtain the information they need.

SUMMARY

It is with respect to the above issues and other problems that the embodiments presented herein were contemplated. The embodiments presented herein map a plurality of application interfaces to a single customer or user experience (i.e. user interface) so that the customer or user (hereinafter the term user can refer to a user and/or a customer) is more comfortable with how information is being presented. Also in the embodiments presented herein, users can stay within an optimal interface model and use that interface as a portal to a variety of applications and data on the backend.

The embodiments include middleware that maps key elements of the original user interface to a standard user interface (UI) on the user's device. Mapping, as performed by the middleware, is a process or method by which one user interface is transformed into a different user interface. When a user interface is mapped, information or data is taken from the original user interface and is reconfigured to create the standard user interface displayed to the user. In embodiments, the middleware receives data associated with a user interface for an application, interprets the received data, parses the data, translates the parsed data by determining the correct template map and mapping the parsed data to a standard user interface, and configures the standard user interface with the translated data.

The standard user interface is the mapped UI presented to the user. The standard UI is the same or similar UI for one or more applications and it is device specific. In embodiments, the standard UI is the final UI mapped according to the standard user interface determined by the device or the user. If the user's device poses limitations as compared with a fully developed interface (e.g. a mobile phone web browser as compared to a computer web browser), the middleware can simplify the fundamental interaction via the mapping and present a simplified UI to the user. Examples of layouts of standard UIs include tiles such as windows mobile, drop-down menus, or rotary selectors such as in Avaya Flare™. In other embodiments, the original UI is mapped to a standard UI on one device and then that same standard UI is updated on a number of devices used by a single user. Therefore, in some embodiments, the standard UI is user specific and is only slightly modified to work on the users various devices.

The standard user interface provided by the middleware has the ability to allow the UI to display and/or provide the user's context and the context of the transaction. The context may include whether the user is accessing a website or an application for personal or work purposes. The middleware also has the ability to consider the application state when mapping the UI. The middleware allows the user interface display to be modified by this state awareness.

The term "user interface," as used herein refers to any means by which a user and a device, machine, or a computer system interact, including the use of hardware (physical components), input devices, UI devices, and software (logical components). A user interface provides a means of input, allowing the user to manipulate a system, and/or output, and allowing the system to indicate the effects of the users' manipulation.

The terms "application user interface data" and "application UI data" as used herein refer to any data typically sent from an application to the user interface on a device or data sent from an application programming interface ("API"). The application UI data may be sent from any database, API, or other medium capable of sending application UI data, including but not limited to the following: an API, a database connected through an API, a database in the application, a database in a different application, a database on the device, a database on an external server, a database on an external device, a database on a network, or any other database, module, or other medium with which the application is in communication.

The term "standard user interface," as used herein refers to any user interface that is the same for two or more applications. A standard user interface can be used by the middleware described herein to provide a standard look and feel to the user, as described in conjunction with FIGS. 4A, 4B, 4C, and 4D. The user may modify the standard user interface, but the standard UI will be consistent for the applications that use the middleware and/or the standard UI.

The term "user interface template," as used herein refers to any general, plain, blank and/or partially blank user interface that serves as a starting point or model, for which the device described herein can modify or complete, to create the user interface displayed to the user, as described in conjunction with FIGS. 4A, 4B, 4C, and 4D.

The term "template map," as used herein refers to any instructions defining a location or any other data for a UI device, a field, a region, or data in the standard user interface. The template map may describe how different types of information and data are arranged in a user interface template, as described in conjunction with FIG. 3B. A template map may be a function that transforms one type of data into another type of data. The template map defines a specific relationship between the original data and the target, or output, data and acts as a mediator between an original user interface and the standard user interface.

The terms "map" or "mapping," as used herein refer to any process or method by which one user interface is transformed into a different user interface. When a user interface is mapped, information or data is taken from an original user interface and is reconfigured to create the standard user interface displayed to the user. Mapping can be performed at different levels: operation mapping, where an operation in one interface is bound to an operation in another interface; and parameter mappings, where a parameter in one interface is bound to a parameter in another interface.

The term "region," as used herein refers to any section of or location on a user interface template, an original UI, or a standard UI designated as a region, as described in conjunction with FIGS. 3B, 4A, 4B, 4C, and 4D. User interfaces are typically broken down into regions to distinguish where different information or data will be displayed to a user.

The terms "user interface device" or "UI device" as used herein refer to any selectable or non-selectable characters associated with the operation of the UI. A user interface device also includes any graphical representation of application data displayed to a user on a user interface, as described in conjunction with FIGS. 3B, 4A, 4B, 4C, and 4D. A user interface device includes buttons, menus, drop-down menus, lists, etc. on which the user can click or select.

The term "field," as used herein refers to any information or data displayed to a user on a user interface as part of a user interface device. A field is a type of information or data relating to the user interface device, as described in conjunction with FIGS. 3B, 4A, 4B, 4C, and 4D. As an example, if the user interface device is a contact card then one field may be a contact's name and another field may be a contact's address.

The term "context," as used herein refers to one or more of the following: a device state (e.g., an application running and/or sending data), an application state (e.g., what is occurring within an application or what data a user has selected or requested from the application), and data from other applications (e.g., a day of the week and a time of day to determine if a task is work-related or personal).

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc. In embodiments, the communication endpoint is a computer system as described in conjunction with FIGS. 7 and 8.

The term "network" as used herein refers to a system used by a communication platform to provide communications between communication endpoints. The network can consist of one or more session managers, feature servers, communication endpoints, etc. that allow communications, whether voice or data, between two users. A network can be any network or communication system as described in conjunction with FIGS. 1, 7, and 8. Generally, a network can be a local area network (LAN), a wide area network (WAN), a wireless LAN, a wireless WAN, the Internet, etc. that receives and transmits messages or data between devices to facilitate communication platform activities. A network may communicate in any format or protocol known in the art, such as, transmission control protocol/internet protocol (TCP/IP), 802.11g, 802.11n, Bluetooth, or other formats or protocols.

The term "database," "archive," or "data structure" as used herein refers to any system, hardware, software, memory, storage device, firmware, component, etc., that stores data. The data model can be any type of database or storage framework described in conjunction with FIGS. 1, 7, and 8., which is stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

The term "module" refers to any known or later developed hardware, software, firmware, artificial intelligence, fuzzy logic, or combination of hardware and software that is capable of performing the functionality associated with that element. Also, while the various concepts are described in terms of exemplary embodiments, it should be appreciated that aspects can be separately claimed.

Hereinafter, "in communication" shall mean any electrical connection, whether wireless or wired, that allows two or more systems, components, modules, devices, etc. to exchange data, signals, or other information using any protocol or format.

The preceding is a simplified summary to provide an understanding of some aspects of the embodiments. This summary is neither an extensive nor exhaustive overview of the various embodiments. It is intended neither to identify key or critical elements nor to delineate the scope of the embodiments but to present selected concepts in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The present disclosure is described in conjunction with the appended Figs..

In the appended Figs., similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the embodiments. Rather, the ensuing description will provide those skilled in the art with an enabling description for implementing the embodiments. Various changes may be made in the function and arrangement of elements without departing from the spirit and scope of the embodiments as set forth in the appended claims.

Figure 1:
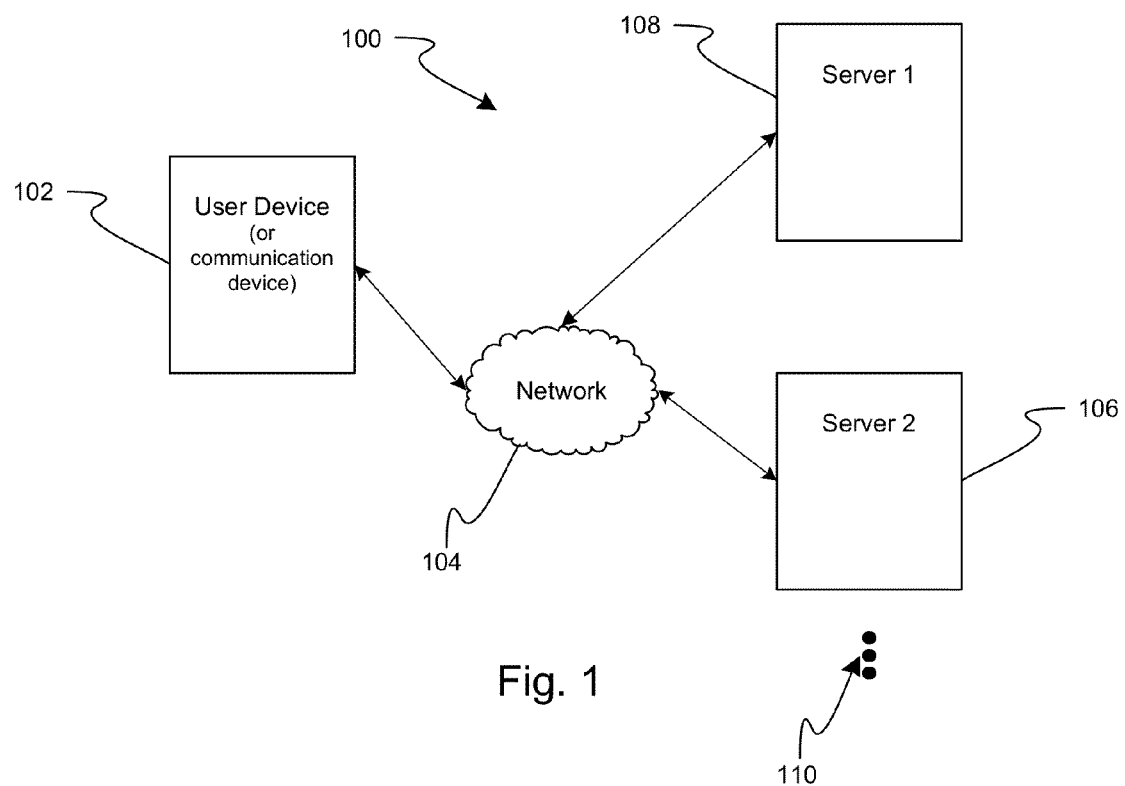
FIG. 1 is a block diagram of an embodiment of a system for sharing data between a device and a network.

A network system 100 for exchanging information over a network 104 is shown in FIG. 1. The network system 100 can include one or more components or devices in communication with each other. The devices in the network system 100 may be hardware and/or software and may function as computer systems with components similar to those described in conjunction with FIGS. 7 and 8. In embodiments, the network system 100 can include a user device or communication device 102, one or more servers 106 and/or 108, and/or one or more other components, user devices 102, or communication devices 102, as is represented by an ellipsis 110.

Figure 7:
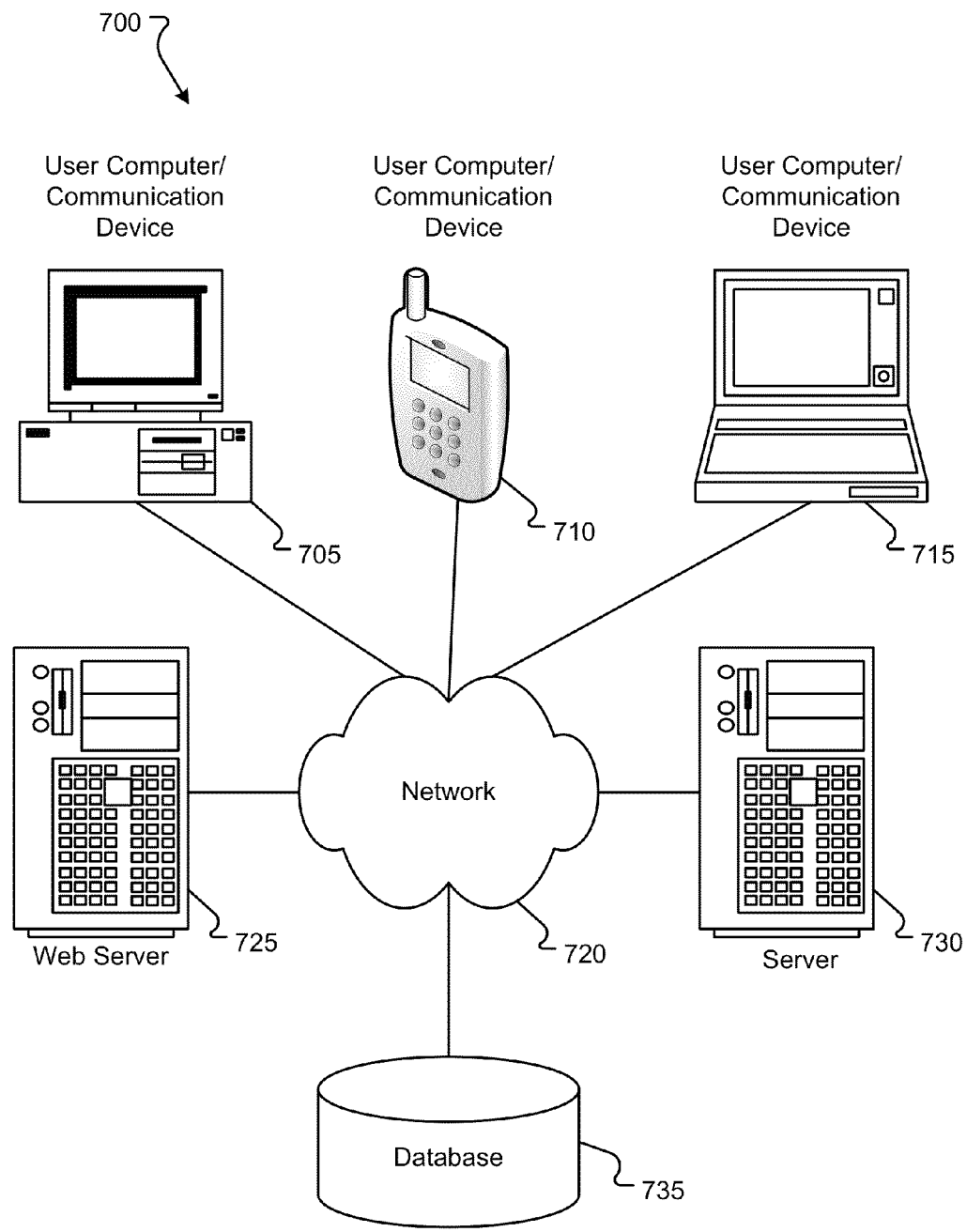
FIG. 7 is a block diagram of an embodiment of a computing environment operable to execute middleware.
Figure 8:
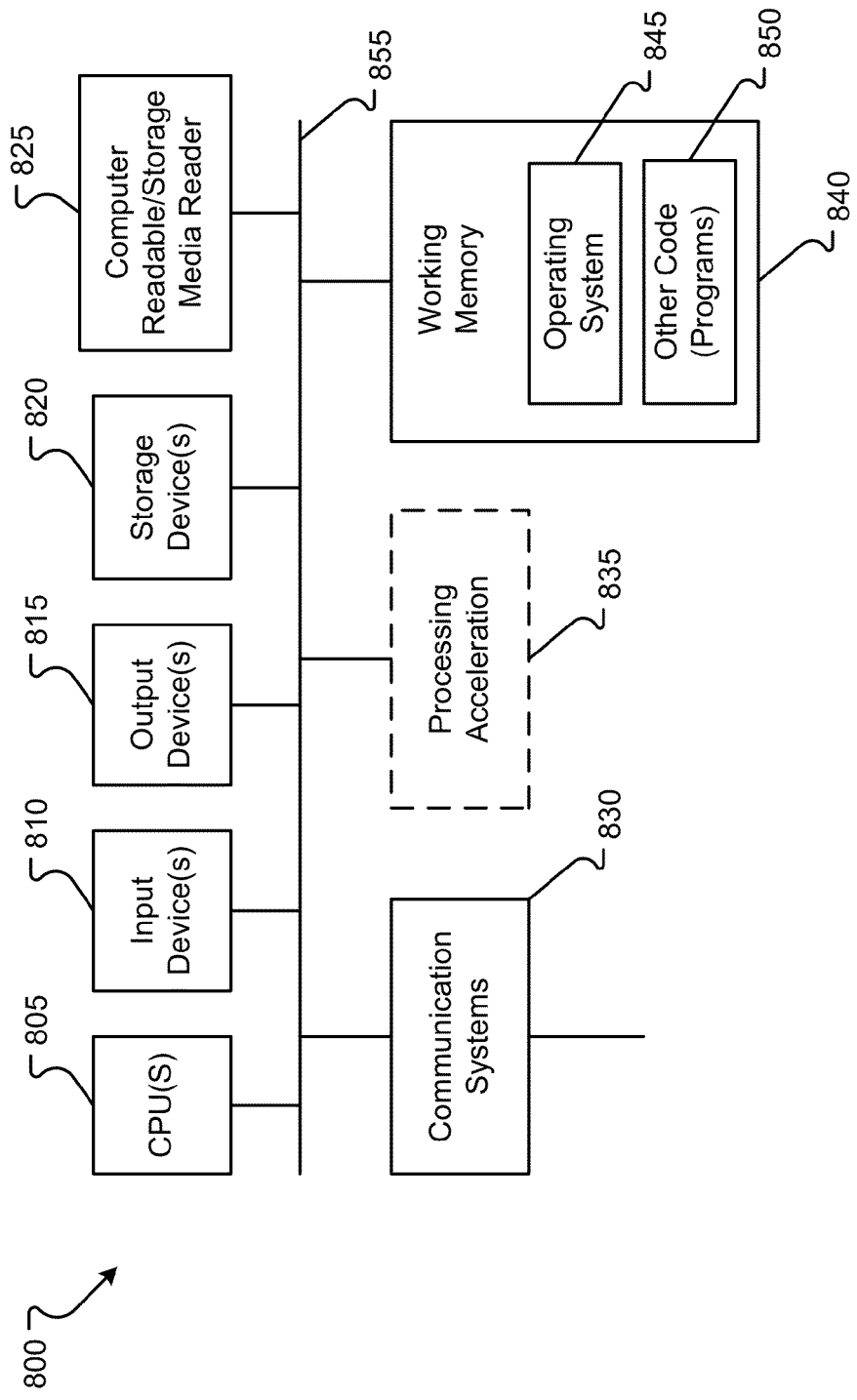
FIG. 8 is a block diagram of an embodiment of a computer operable to execute middleware.

A user device 102 can include hardware and/or software, such as a processor and memory, as described in conjunction with FIGS. 7 and 8. The user device 102 can be any communication device, computing device, mobile device, laptop, tablet computer, desktop computer, or other type of device that can communicate with a network 104 or with other devices. These communications can be over any network 104, such as a local area network ("LAN"), an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol art, and/or any other wireless protocol); and/or any combination of these and/or other networks.

The servers 106 and 108 may be hardware and/or software (including a processor and memory) and may be functioning as a computer system, as described in conjunction with FIGS. 7 and 8. Thus, at least one of the servers 106 and/or 108 is operable to communicate with one or more user devices 102 through the network 104. In embodiments, at least one of the servers 106 and/or 108 is operable to transmit data to a user device 102.

Figure 2A:
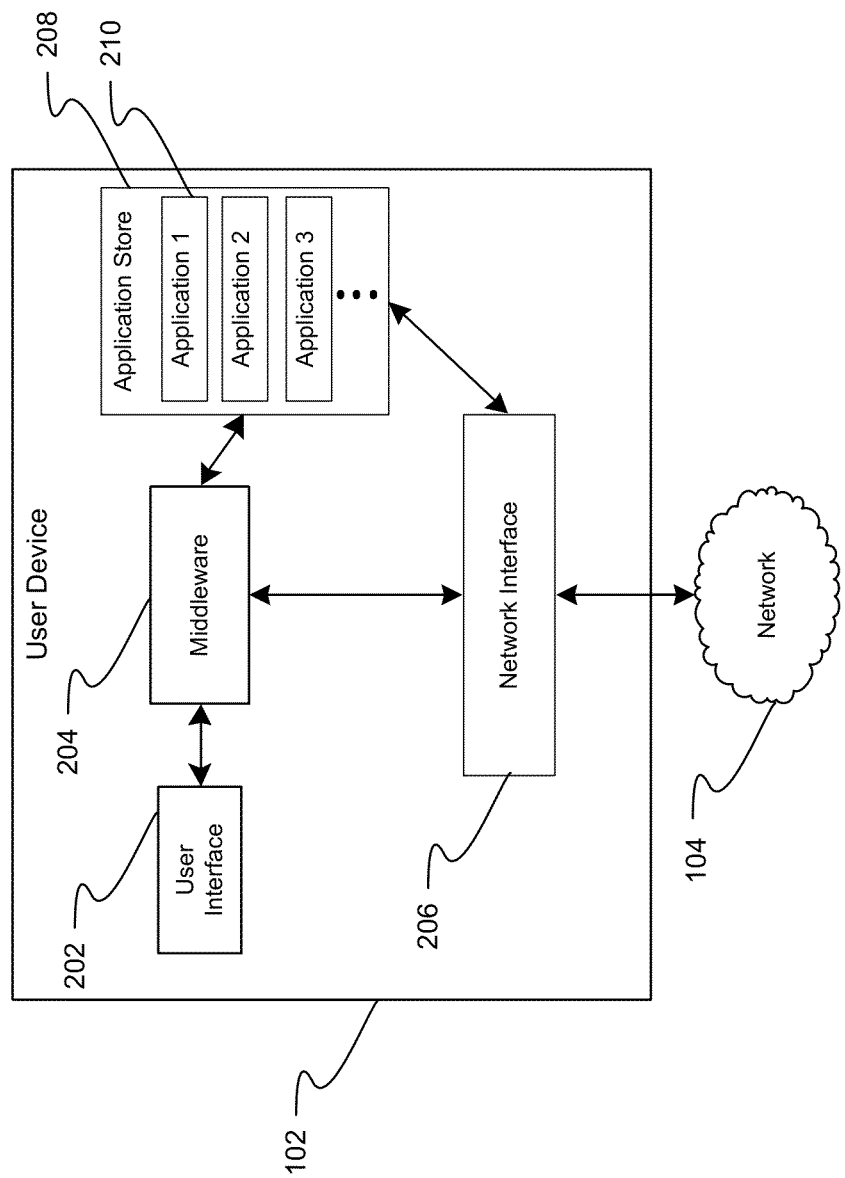
FIGS. 2A and 2B are block diagrams of embodiments of a device and middleware, respectively, which can map a user interface.
Figure 4A:
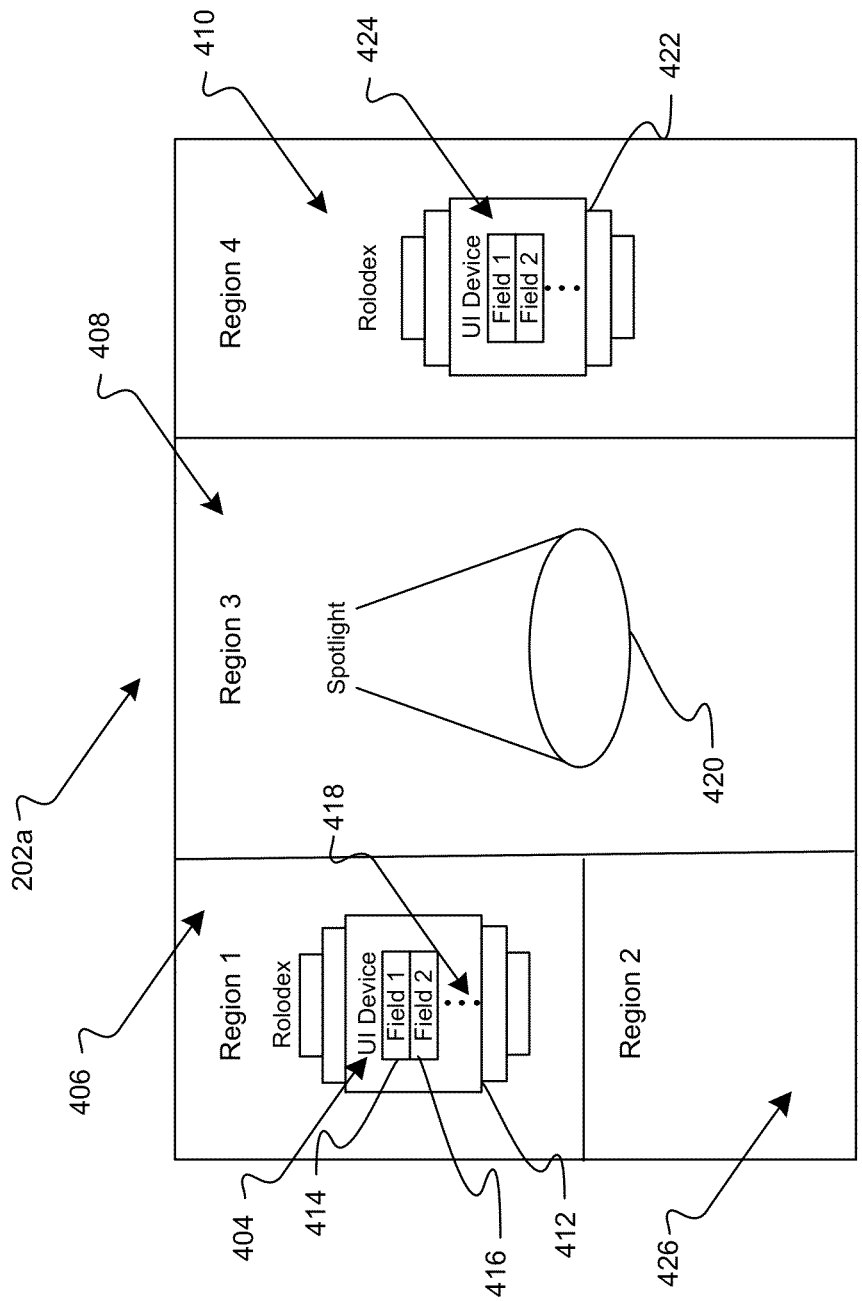
FIGS. 4A, 4B, 4C, and 4D are visual representations of embodiments of user interfaces either before or after an original user interface is mapped to a standard user interface.

An embodiment of a user device 102 is shown in FIG. 2A. The user device 102 may include one or more components, which may include hardware and/or software. The components herein may be described as software modules but the user device 102 is not so limited. The components within the user device 102 can include one or more of, but are not limited to, a user interface 202, middleware 204, a network interface 206 connected to the network 104, and an application store 208. The user interface 202 may be as described in conjunction with FIGS. 4A, 4B, 4C, and 4D. Further, the middleware 204 can provide a standardized user interface 202, which may be as shown in FIGS. 4A, 4C, and 4D, that can interact with a user of the user device 102. The middleware is further described in conjunction with FIGS. 2B, 5, 6A, and 6B.

The application store 208 can contain different applications for execution on the user device 102. In embodiments, an application 210 is executed on the processor. One or more applications 210 and/or APIs are operable to send data to one or more of the middleware 204 and/or the user interface 202. One or more applications 210 and/or APIs may be in communication with the network 104 and able to send data to and receive data from the network 104 through the network interface 206.

Figure 2B:
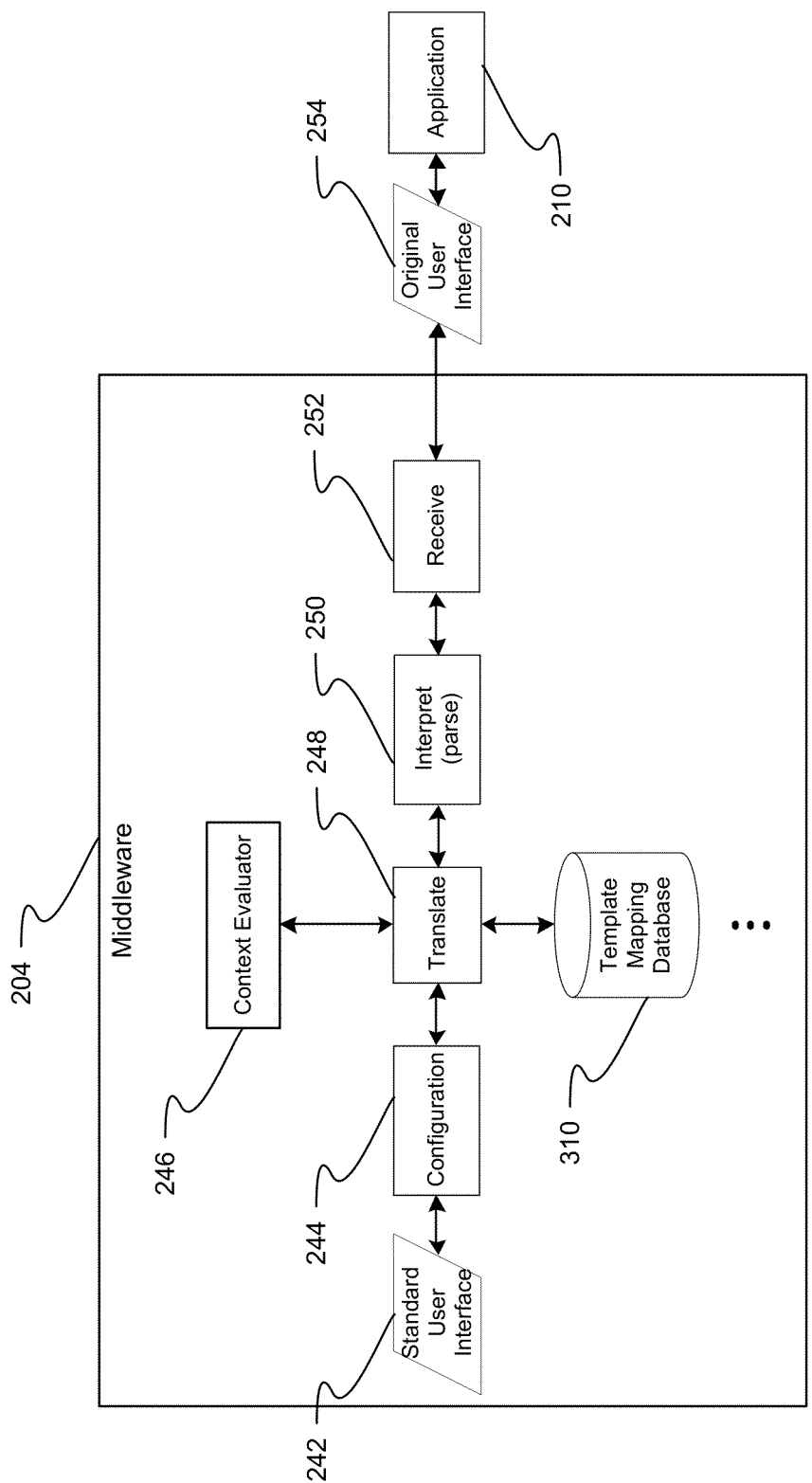

An embodiment of the middleware 204 is shown in FIG. 2B. The method for providing a standard user interface on a user device 102 is further described in conjunction with FIGS. 5, 6A and 6B. In one embodiment, the middleware 204 is executed on the processor. The middleware 204 is operable to receive 252 data, including application UI data, from either the application 210, an original user interface 254, the application store 208, the network 104, or an application programming interface ("API"). In one embodiment, the middleware 204 is operable to interpret and parse 250 the received data. The middleware 204 is operable to translate 248 the received data into a standard user interface 242 based on a user interface template, which may be as further explained in FIGS. 5, 6A, and 6B. The standard user interface 242 may be as shown in FIGS. 4C and 4D as 202c and 204d, respectively. A standard user interface template may be as shown in FIG. 4A as 202a. One embodiment of a method of translation performed by a translation module 248 of the middleware 204 is further described in conjunction with FIG. 6B. As part of the translation module 248, the middleware 204 may be operable to evaluate a context 246 of the application UI data or the user device 102 and use this context to determine which template map to use from a template mapping database 310. The template map may be a map to a standard user interface 242 or to another UI and may be as described in conjunction with FIG. 3B. The middleware 204 is operable to select and retrieve a template map from the template mapping database 310. The middleware 204 is operable to use the template map to map the application UI data to the standard UI or to another desired UI. The middleware 204 is operable to configure 244 the translated application UI data into the standard user interface 242.

Figure 3A:
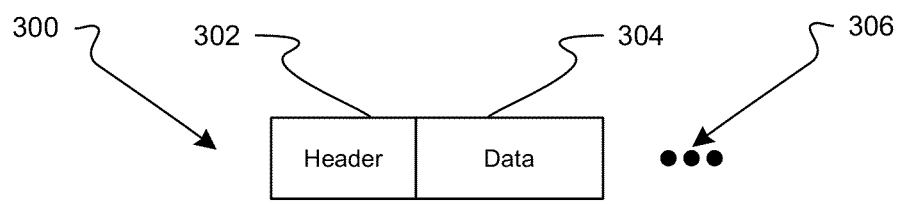
FIGS. 3A and 3B are logical block diagrams of embodiments of data that can be exchanged to display a user interface.

An embodiment of incoming application user interface data 300 is shown in FIG. 3A. The application UI data 300 can include different portions or fields, which represent segments of the application UI data 300 where certain types of information are stored. These portions can include a header 302 and data 304. Other segments containing other types of information may be included in the application UI data 300 as is represented by an ellipsis 306.

The header 302 can include information that facilitates the communication of information. Thus, the header 302 can include the destination and/or the origin of the application UI data 300. The header 302 may also include other information to synchronize the application U! data 300, such as a data offset, a data length, or other information that allows a user device 102 or a server 106 to accept the application UI data 300. In embodiments, the header 302 includes information about the data, such as a source, time stamp, etc. associated with the application UI data 300. In one embodiment, the header 302 information can be used by the receiver to determine how to process the application UI data 300. In embodiments, the header 302 may contain information about which template map from the template mapping database 310 is associated with the application UI data 300. Further, the header 302 information can provide a context about the application UI data 300.

The data field 304 can store the data 304 or content that is being transferred between the different devices. The data 304 can include presentation materials, documents, or other information that may be exchanged between the application 210 and the user interface 202 on the user device 102 or between the user device 102 and a server 106. The data 304 may be encapsulated in one or more protocols or forms that may be accepted by the user device 102 or the server 106.

Figure 3B:
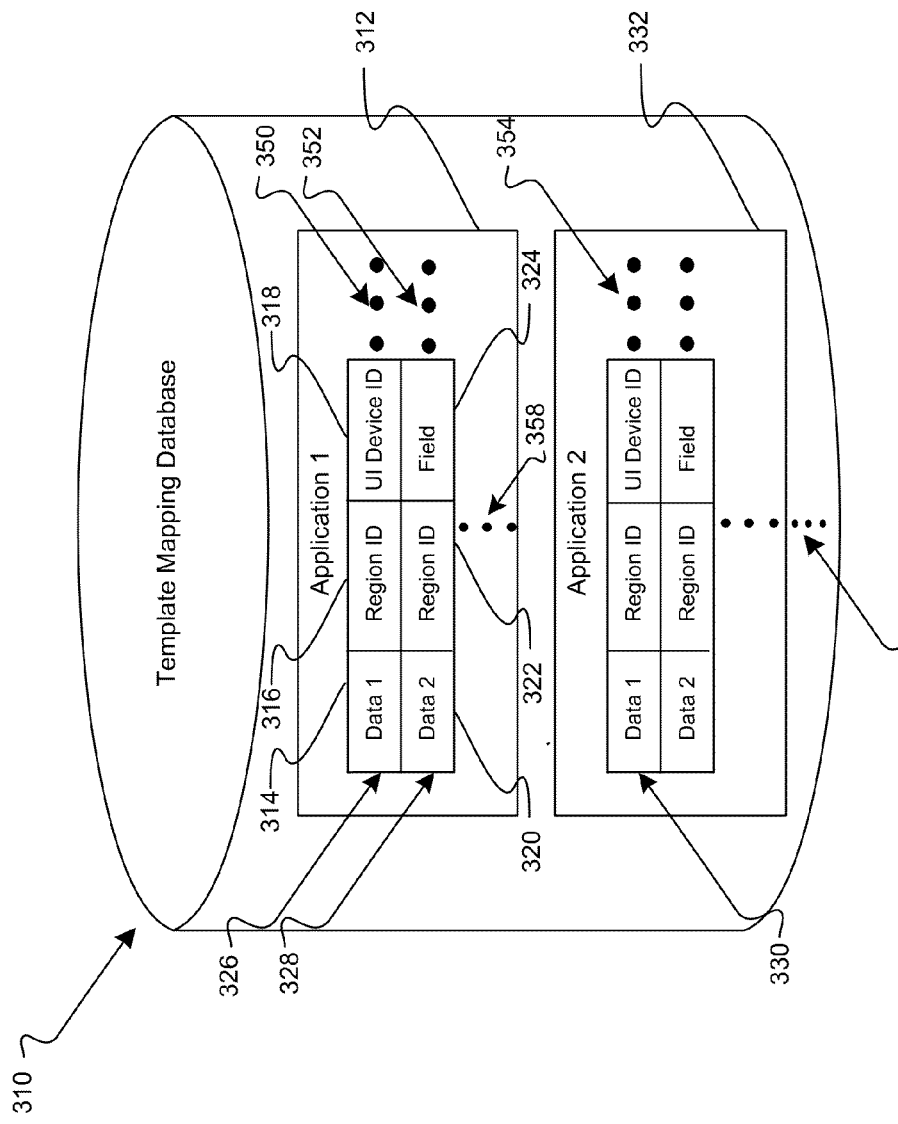

A template mapping database 310 is shown in FIG. 3B. Embodiments of template maps 312 and 332 for user interfaces associated with application 1 and application 2, respectively, are shown within the template mapping database 310 in FIG. 3B. Map sections 326 and 328 may further include one or more portions 314, 316, and/or 318 and 320, 322, and/or 324, respectively. Map section 330 includes a data 1 portion, a region ID portion, a UI device ID portion, and possible other portions, as is represented by the ellipsis 354. The portions 314, 316, 318, 320, 322, and 324 may be a UI field 324, (or 414 and 416 as shown in FIG. 4A), a UI device ID 318, a region ID 316 or 322, a piece of data (data 1 314 or data 2 320), or other application UI data 300. The region ID 316 or 322 identifies in which region data 1 314 or data 2 320 will be presented to the user, as further described in conjunction with FIGS. 4A, 4B, 4C, and 4D. The region ID 316 or 322 tells the user interface in which region (as shown in FIG. 4A as 406, 408, 410, and 426) on the device screen to display the data 1 314 or data 2 320. The UI device ID 318 indicates to which UI device the data 1 314 belongs. A UI device is any selectable or non-selectable character associated with the operation of the user interface. A UI device also includes any graphical representation of application data displayed to a user on a user interface, as further described in conjunction with FIGS. 4A, 4B, 4C, and 4D. A user interface device includes buttons, menus, drop-down menus, lists, etc. on which the user can click or select. A field 324 is any information or data displayed to a user on a user interface as part of a UI device. A field is a type of data relating to the UI device, as further described in conjunction with FIGS. 4A, 4B, 4C, and 4D. As an example, if a UI device is a contact card then one field may be a contact's name, another field may be a contact's address or email address, and another field may be a contact's phone number.

The map sections 326, 328, and 330 can include more or fewer portions 314, 316, 318, 320, 322, and/or 324 than those shown in FIG. 3B, as represented by ellipses 350, 352, and 354. The template maps 312 and 332 can contain more or less map sections 326, 328, and 330, as represented by an ellipsis 358. Furthermore, the map sections 326, 328, and 330 can be arranged in a different order than shown in FIG. 3B.

The template mapping database 310 contains template maps 312 and 332, which the middleware 204 to can use to map application UI data 300 to a standard UI 242. The database may contain more or fewer template maps as is represented by an ellipsis 356. The template maps 312 and 332 may or may not differ with different applications 210. In one embodiment, each application 210 has its own template map 312 or 332. In another embodiment, the middleware 204 selects a template map 312 or 332 based on the characteristics of the application 210 and/or the characteristics of the application UI data 300. As an example, if the application UI data 300 received by the middleware 204 has characteristics that are similar to the characteristics of application UI data 300 for displaying contact information to a user on a user interface 202, then the middleware 204 will select and use a template map 312 or 332 that it uses for contact information applications. The middleware 204 uses the template map 312 or 332 to standardize the original application user interface 254 to the standard user interface 242. The template maps 312 and 332 also define a location for a UI device or a field 324 in the standard user interface 242. The template maps 312 and 326 tell the middleware 204 how to configure the data such that the user interface 202 knows where and how to display the application UI data 300 to the user on the user device 102 user interface 202.

In embodiments, the map sections 326, 328, and 330 contain user interface data 314 or 320, a region ID 316 or 322, and/or a UI device ID 318 and/or the field 324. In one embodiment, the data 314 and 320 contains the information to be displayed to the user. The region IDs 316 and 322 contain information as to where on the user interface 202 the information will be displayed to the user. The region ID 316 or 322 may correlate to a region shown in FIG. 4A, such as Region 1 406, Region 2 426, Region 3 408, or Region 4 410. In the embodiments, the template maps 312 and 332 use the standard UI template 202a to instruct the middleware 204 as to how to configure the original application UI data so that the UI 202 seen by the user is the standard UI 242.

In embodiments, each piece of application UI data 300 being mapped into the standard UI 242 is associated with a region, UI device, field 324, and/or other part of the user interface 202. For example, data (a contact's name) is associated with a field (contact name) of a UI device (a contact card) displayed in a region (Region 1 of the standard UI template 202a shown in FIGS. 4A and 4C). The original application UI data may already be associated with a device, field, region, and/or other part of a UI 202 when the application UI data 300 is received by the middleware 204, or the middleware 204 may associate the application UI data 300 with the desired field, UI device, region, and/or other part of the user interface 202. The middleware 204 associates the application UI data 300 with a UI device, field, region, and/or other part of the UI 202 by looking at the characteristics of the original application UI data, using the template maps 312 and 332 and the standard UI template 202a. The association basically determines where the application UI data 300 will be displayed on the screen to the user. Using the template maps 312 and 332, the middleware 204 decides where to place the data on the standard UI 242 and associates the data so that the data will be placed in the correct location on the standard UI 242.

In embodiments, the UI device ID 318 contains information as to which UI device, within the region, data is associated. In other words, a UI device ID 318 may be a number given to each UI device so that the middleware 204 and the UI 202 know to which UI device the data pertains and where on the UI 202 the data should be displayed to the user. The UI device may include, for example, a contact card (as shown in FIG. 4C as 450c), a button to call the contact, a button to email the contact, a product card (as shown in FIG. 4D as 424d), a button to order the product, and/or any other selectable or non-selectable UI device displayed to the user on the UI 202. The UI device may also include menus, drop-down menus, lists, etc. on which a user can click or select. The UI device ID 318 may be a number relating to a specific UI device. The field 324 contains the information that will be displayed to the user within the UI device on the user interface 202. The field 324 may include, for example, a contact's name (as shown in FIG. 4C as 462c), a contact's phone number (as shown in FIG. 4C as 464c), a contact's address, a contact's email address, product 1 (as shown in FIG. 4D as 414d), product 2 (as shown in FIG. 4D as 416d), the product's name (as shown in FIG. 4D as 425), the product's price (as shown in FIG. 4D as 427), the product's shipping options or price, or any other information relating to a UI device. The field 324 may have a specific number such that the middleware 204 and UI 202 know where and how to display the field 324 to the user on the user interface 202, for example 1 (as shown in FIG. 4A as field 1 414) or 2 (as shown in FIG. 4A as field 2 416). In the example, the middleware 204 and UI 202 know that field 1 (as shown in FIG. 4A as 414) is displayed in the UI device (as shown in FIG. 4A as 404) above field 2 (as shown in FIG. 4A as 416), which is also displayed in the same UI device (as shown in FIG. 4A as 404).

Embodiments of a user interface 202 presented to a user on a user device 102 are shown in FIGS. 4A, 4B, 4C, and 4D as 202a, 202b, 202c, and 202d respectively. The user interface 202 can be displayed on a user device 102, as explained in conjunction with FIGS. 7 and 8. In one embodiment, the user interface 202 can present information to a user and allow for the user to provide inputs through one or more selectable UI devices 404, 424, 430, 432, 438, 460, 438c, 432c, 450c, 404d, and/or 424d on the user interface 202, 202a, 202b, 202c, and 202d. In embodiments, the UI devices may or may not be selectable.

An embodiment of a standard user interface template 202a is shown in FIG. 4A. The user may or may not set the standard user interface template 202a. The standard user interface template 202a acts as a model to be used by the middleware 204 to create a standard user interface 242, 202c, or 202d to be displayed to the user. In embodiments, there are four regions 406, 426, 408, and 410. There may be more or fewer regions in a standard user interface template 202a. In an embodiment, Region 3 408 contains a spotlight 420 to highlight the selected item, contact, or other UI device 404 or 424. In an embodiment, Region 1 406 contains a rolodex 412 of different UI devices 404 for the user to select. The UI devices 404 and 412 may display contacts, applications, or other information. The UI device 404 contains field 1 414 and field 2 416. Each field 414 and/or 416 displays information associated with the UI device 404. The fields 414 and 416 are associated with the UI device 404 either because the application 210 associates the fields 414 and 416 with the UI device 404, the middleware 204 associated the field with the UI device 404, an API associates the fields 414 and 416 with the UI device 404, or the fields 414 and 416 are somehow associated with the UI device 404 through another means. The UI device 404 may contain more or less fields 414 and 416 than is displayed in FIG. 4A, as represented by the ellipsis 418. In an embodiment, Region 4 410 also contains a rolodex 422 of different UI devices 424 for the user to select. The UI device 424 may contain other information than the UI device 404 in Region 1 406. The UI device 424 can also contain the same or different fields than the UI device 404 in Region 1 406. The field or fields in the UI device 424 display information associated with the UI device 424, meaning that the field or fields and/or information contained in the field or fields are somehow related to the UI device 424. The UI device 424 may contain more or fewer fields than is shown in FIG. 4A. In an embodiment, Region 2 426 can contain other information desired by the user. The information may relate to the selected item in the spotlight 420 or one of the selected UI devices 404 or 424.

Figure 4B:
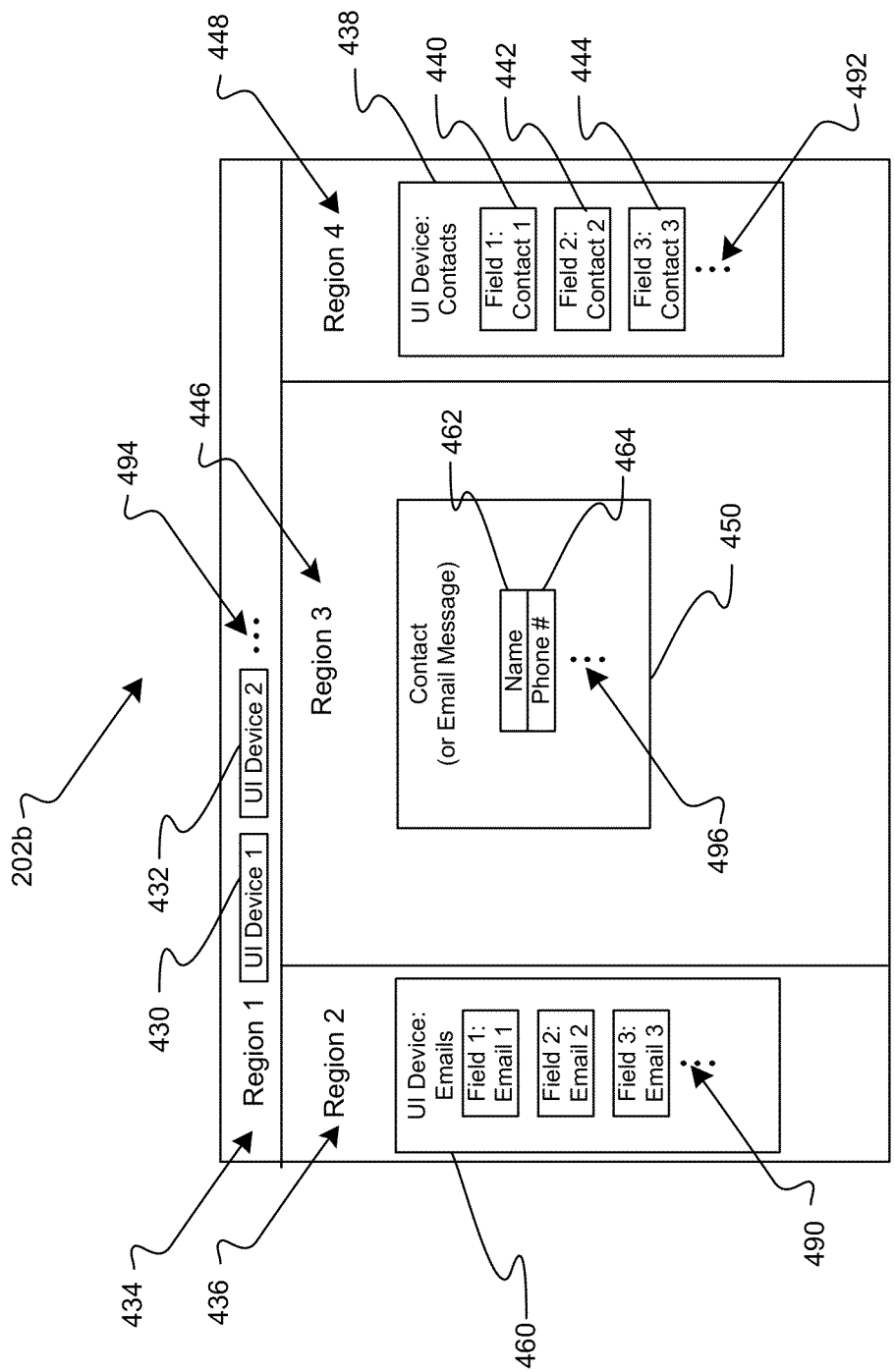
Figure 4C:
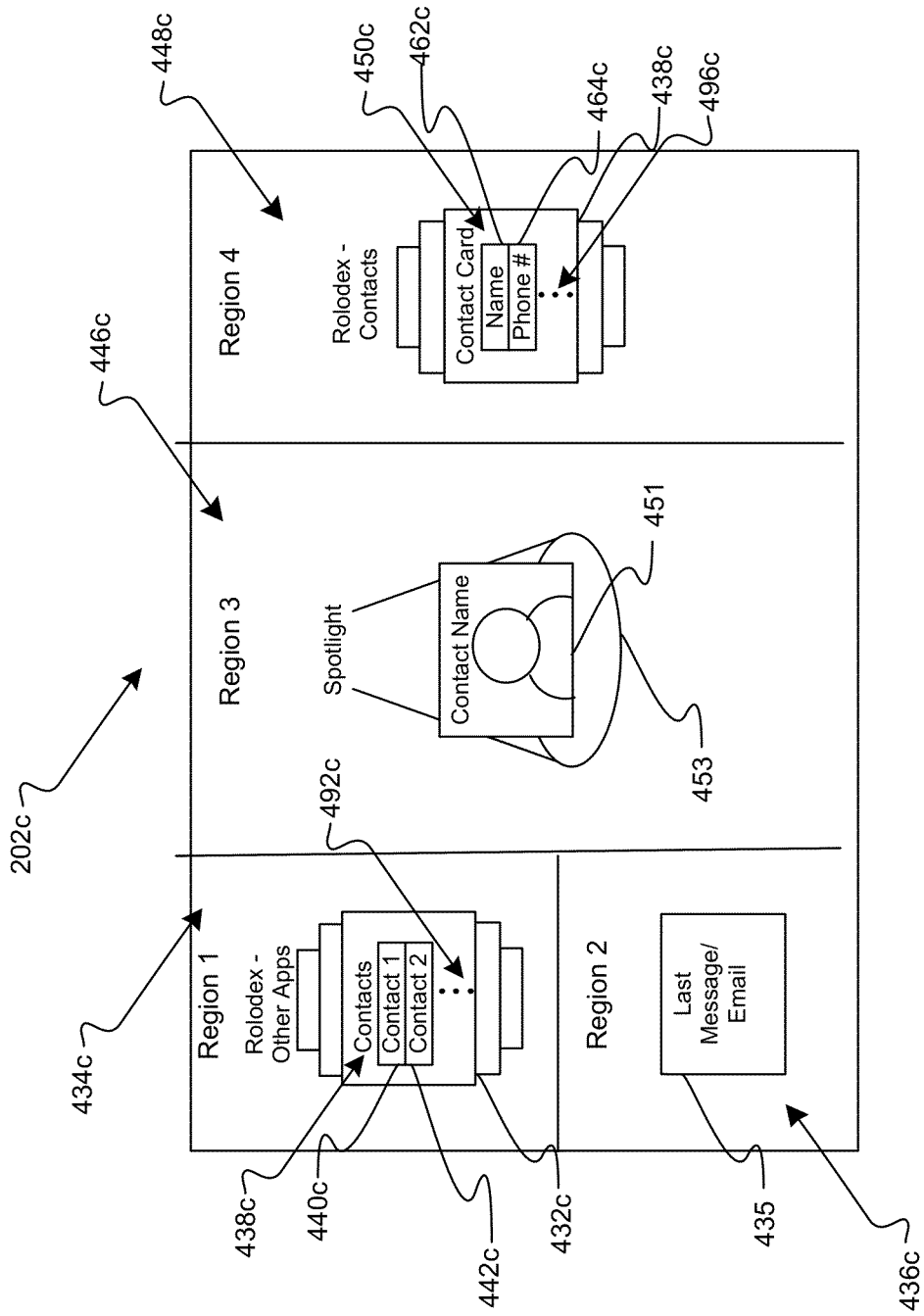
Figure 4D:
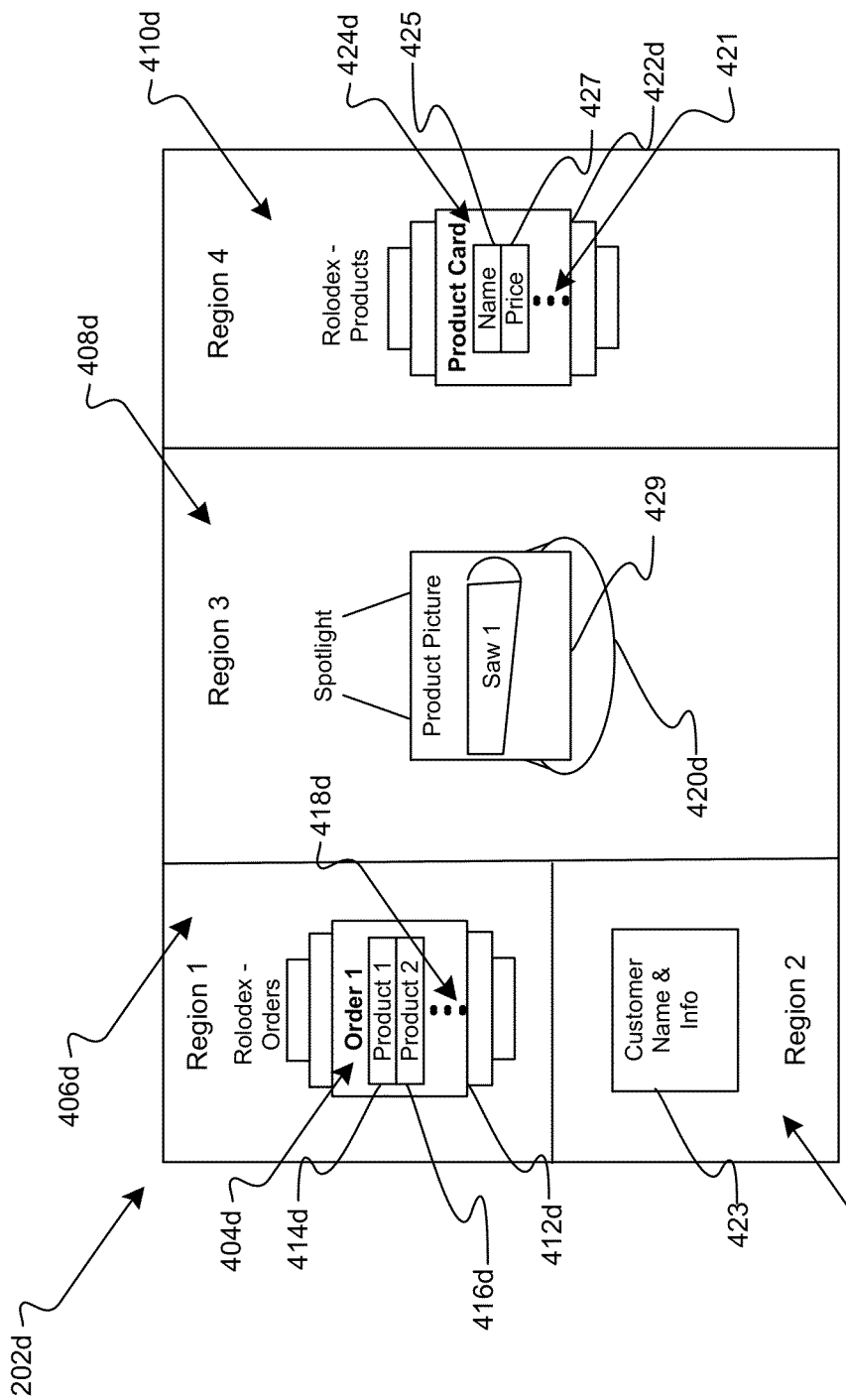

An embodiment of an email or a contact list application user interface 202b before it is mapped into the standard UI 202c is shown in FIG. 4B. In one embodiment, the original UI 202b contains four regions 434, 436, 446, and 448. In an embodiment, Region 1 434 contains selectable and/or non-selectable UI devices 430 and 432. More or fewer UI devices 430 or 432 may be present in Region 1 434 as is represented by the ellipsis 494. The UI devices 430 and 432 may be contacts; emails; files; buttons, such as email, delete, or reply; or any other UI device or button. In an embodiment, Region 2 436 contains one or more UI devices 460. The UI device 460 may be filed emails or the user's email history. The UI device 460 may also contain fields, such as different emails. More or fewer fields may be displayed, as is represented by an ellipsis 490. In an embodiment, Region 3 446 contains one or more selected contact or email message 450. The selected contact 450 may also be displayed with fields such as the contact's 450 name 462 or phone number 464. More or fewer fields 462 and/or 464 associated with the contact 450 may be displayed, as is represented by an ellipsis 496. In an embodiment, Region 4 448 contains one or more UI devices 438. The UI device 438 may be contacts. The UI device 438 may also contain fields 440, 442, and/or 444 such as different contacts. More or fewer fields 440, 442, and/or 444 may be displayed, as is represented by an ellipsis 492.

In FIG. 4B, the UI device: emails 460 may or may not be mapped into the standard user interface 202c, shown in FIG. 4C. Additionally, more or fewer email fields may be displayed as is represented by the ellipsis 490.

FIG. 4C shows one embodiment of the original user interface 202b after the original UI 202b is mapped into the standard UI 202c using the standard UI template 202a. Note that figure numbers correlating to both FIGS. 4B and 4C are the same number, except that a "c" is added to the number in FIG. 4C. Furthermore, if a numbered item in FIG. 4C does not correlate to a number in FIG. 4B, then the item is numbered using an odd number.

In an embodiment, an original Region 1 434 is mapped to the new Region 1 434c. The same is true for original Region 2 436, Region 3 446, and Region 4 448, which are mapped to Region 2 436c, Region 3 446c, and Region 4 448c, respectively. The middleware 204 may map the original regions 434, 436, 446, and 448 to the new regions 434c, 436c, 446c, and 448c through different means. In one embodiment, the middleware 204 maps the regions by following settings set by the user. The user may set the middleware 204 to map the original email or contact application into the standard UI 202c in a specific way set by the user. In another embodiment, the middleware 204 maps the regions by knowing that original Region 1 434 contains information similar to the information found in Region 1 406 of the standard UI template 202a and knowing that Region 1 406 of the standard UI template 202a is mapped to Region 1 434c of the standard UI 202c. In another embodiment, the middleware 204 maps the regions by looking at the characteristics of the information contained in original Region 1 434 and seeing that the characteristics are similar to the characteristics of the data in Region 1 406 of the standard UI template 202a. In another embodiment, the middleware 204 maps the regions by using some other method known in the art.

The different UI devices 430 and 432 that a user may select from the original Region 1 434 are mapped to a rolodex 432c in Region 1 434c of the standard user interface 202c. In an embodiment, the middleware 204 maps the original UI devices 430, 432, 438, and/or 460 to the various rolodexes 432c and 438c using the standard UI template 202a. In the embodiment, the middleware 204 knows that the rolodexes 432c and 438c are composed of UI devices 438c and 450c because the rolodexes 412 and 422 in the standard UI template are composed of UI devices 404 and 424. In an embodiment, the rolodex 432c contains other available UI devices, which may be other applications available to the user. The other applications may or may not have been the UI devices 430 and 432 in the original UI 202b. In an embodiment, the user selects any UI device, such as contacts 438c, and the selected UI device 438c is displayed as the chosen UI device in the rolodex 432c in Region 1 434c. Contacts 438 were originally displayed in Region 4 448 of the original UI 202b, and now are displayed in Region 1 434c. The middleware 204 may know to map the contacts 438 from the original Region 1 434 to Region 1 434c because the user set the middleware 204 to map the original UI 202b contacts 438 in such a manner. In another embodiment, the middleware may use the standard UI template 202a and see that contacts are in Region 1 406, thus the original contacts 438 should be mapped to Region 1 434c of the standard UI 202c. In the embodiment, fields 440c and 442c may be different contacts (contact 1 440c and contact 2 442) and the contacts are mapped from the original fields 440 and 442 (field 1: contact 1 440 and field 2: contact 2 442). The contacts 440 and 442 may be mapped in this way because the user set the standard UI 202c to map contacts 440 and 442 in this manner. In another embodiment, the middleware 204 may map the contacts 440 and 442 to 440c and 442c because the characteristics of the data of the original contacts 440 and 442 is similar to the fields 440c and 442c in the standard UI 202c. More or fewer fields may be shown as is represented by the ellipsis 492c.

In an embodiment 202c, the user may select a contact from the list in Region 1 434c. The selected contact's information was originally displayed in Region 3 446 of the original UI 202b, and after the mapping, the selected contact will be displayed as a contact card 450c in Region 4 448c. The contact card 450c is a UI device and contains fields, such as the contact name 462c and phone number 464c. The fields 462c and 464c are associated with the UI device 450c. In one embodiment, the information for these fields 462c and 464c comes directly from fields 462 and 464 in the original UI 202b. More or fewer fields may be displayed, as is represented by the ellipsis 496c. Additionally, in an embodiment, the standard UI 202c puts a picture 451 of the selected contact 450c in a spotlight 453 in Region 3 446c. In embodiments, Region 3 446c can also contain other selectable UI devices, such as a call button, email button, etc. (not shown). These buttons may allow the user to call or email the selected contact 450c with the click of a button. In one embodiment, the last instant message or email message 435 from the selected contact 450c can be displayed in Region 2 436c.

In embodiments, a user may select contacts from the rolodex 432c as the UI device 438c in Region 1 434c. Contacts are then listed in the fields 440c and 442c. More fields may be displayed as is shown by the ellipses 492c. Contact cards 450c are now displayed in the rolodex 438c in Region 4 448c. The contact cards 450c are the UI devices. The fields of the contact card 450c include the contact's name 462c and the contact's phone number 464c. More fields may be displayed as is shown by an ellipsis 496c. The user can select a contact from the rolodex 438c in Region 4 448c. The contact's picture 451 will appear in the spotlight 453 of Region 3 446c. Selectable UI devices, such as buttons, (not shown) may also be present in Region 3 446c allowing the user to call or email the highlighted contact 451 and 450c. In an embodiment, Region 2 436c will display the last message or email 435 from the highlighted contact 451 and 450c.

In another embodiment, the user or application 201 may be using a protocol, such as LDAP for example, to gain access to the data in Region 4 448 or 448c, rather than from the original UI 202b. The embodiment can also be described in conjunction with FIG. 2B where the original UI 254 is now a protocol 254. The protocol 254 now sends the data to the middleware 204. Often times it is easier to get the data and/or the application UI data 300 via development interfaces or protocols 254 rather than from the original UI 254 directly. The embodiment covers the middleware 204 receiving 252 data from development interfaces, protocols 254, APIs, an original UI 254, and other methods of receiving data.

FIG. 4D shows one embodiment of a commercial application's user interface after the commercial application's UI is mapped into the standard UI 202d using the standard UI template 202a. A commercial application UI may contain order histories for customers. The embodiment in FIG. 4D is an example of a commercial application UI containing order histories after the UI is mapped into the standard UI 202d. Figure numbers used to describe FIG. 4D may relate to the standard UI template 202a shown in FIG. 4A. Figure numbers correlating to both FIGS. 4A and 4D are the same number, except that a "d" is added to the number in FIG. 4D. Furthermore, if a numbered item in FIG. 4D does not correlate to a number in FIG. 4A, then the item is numbered using an odd number.

In embodiments, Region 2 426d displays the customer information 423. In the example shown in FIG. 4D, Region 1 406d contains a rolodex 412d with UI devices such as orders 404d for the customer 423 shown in Region 2 426d. The user may select an order 404d (which is a selectable UI device) and the fields 414d and 416d of the order 404d will display the products 414d and 416d ordered by the customer 423 in the selected order 404d. More or fewer products/fields 414d and/or 416d may be displayed in the order 404d, as is represented by an ellipsis 418d. In embodiments, the rolodex 422d in Region 4 410d now displays the product cards 424d for the products ordered in the selected order 404d. The product card 424d may contain fields such as the product name 425 and/or the product price 427. More or fewer fields may be shown on the product card 424d as is represented by an ellipsis 421. The user may select a product card 424d from the rolodex 422d in Region 4 410d. The selected product 424d will be highlighted in the spotlight 420d in Region 3 408d. In one embodiment, the spotlight 420d can contain a picture of the product 429. Selectable UI devices, such as buttons, for example, which may include an order button or track shipment button, may be available in Region 3 408d for the user to select.

In other embodiments, the original UI 202b is mapped to a standard UI 202c on one user device 102, and then that same standard UI 202c is updated on a number of user devices 102 used by a single user. Therefore, in some embodiments, the standard UI 202c is user specific and is only slightly modified to work on the users various user devices 102.

In other embodiments, users can stay within an optimal interface model, the standard UI 202a, 202c, or 202d, and use that standard UI 202a, 202c, or 202d as a portal to a variety of applications 210 and data on the backend.

Figure 5:
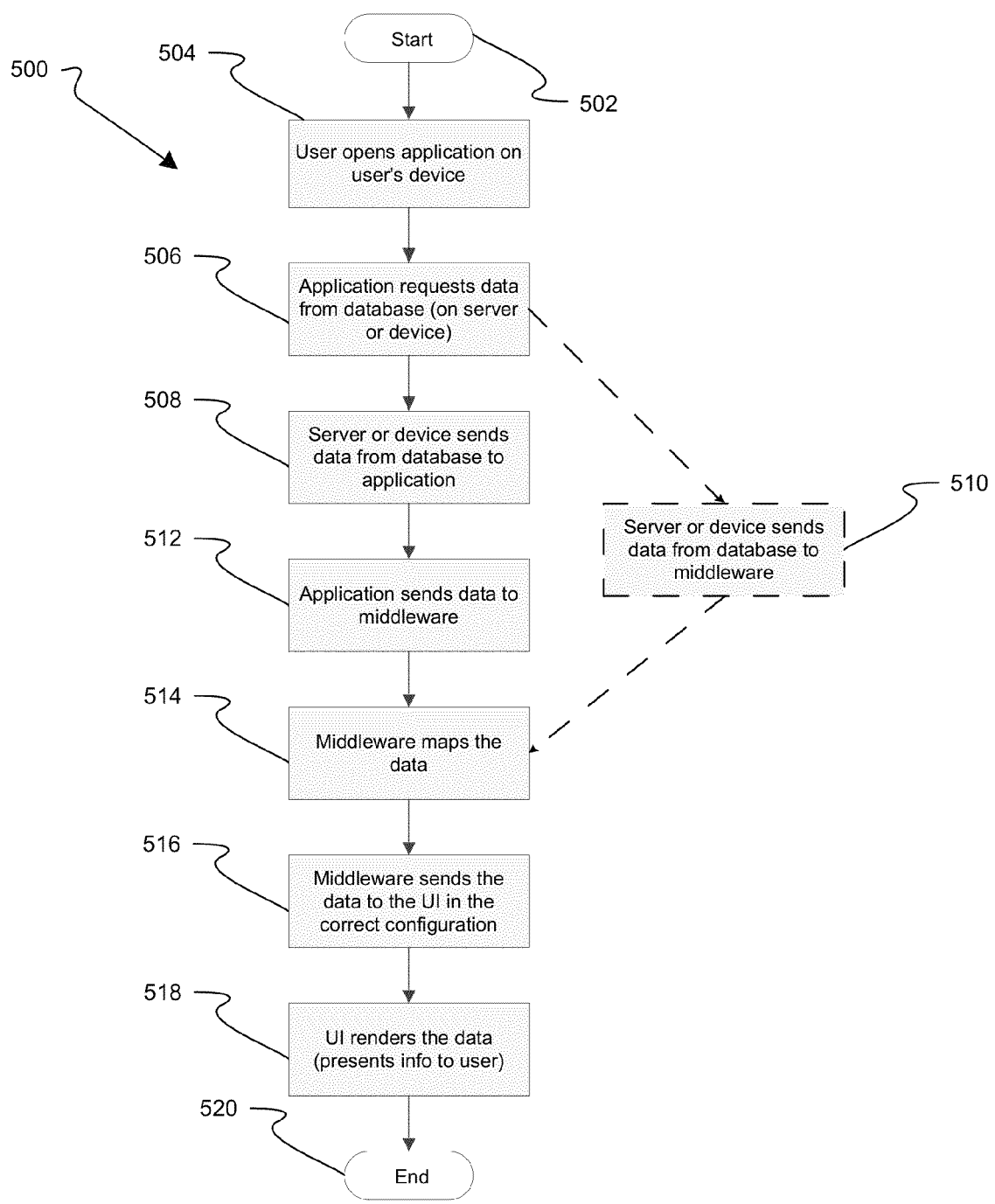
FIG. 5 is a flow diagram of an embodiment of a process for mapping a user interface.

An embodiment of a method 500 utilizing the middleware 204 in a system to standardize a user interface 202 is shown in FIG. 5. A general order for the steps of the method 500 is shown in FIG. 5. Generally, the method 500 starts with a start operation 502 and ends with an end operation 520. The method 500 can include more or fewer steps and/or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, user interfaces, etc. described in conjunction with FIGS. 1-4D.

In an embodiment, a user can open an application 210 on a user device 102, in step 504. The user can open or start the application by selecting a user interface device on the user device 102. The device processor will receive data associated with a user interface 202 in a request to execute an application. The processor will execute the application 210 and the middleware 204. Upon starting the application 210, the application 210 can request application UI data from a database on a server 106, on the user device 102, on the network 104, or from any other accessible source, in step 506.

Upon requesting the data, either step 508 or step 510 can be performed. If the server 106, user device 102, or other source sends the requested information back to the application 210, then step 508 is performed. If the server 106, user device 102, or other source sends the requested information to the middleware 204, then step 510 is performed. If step 508 is performed, then the application 210 can send the requested information to the middleware 204 in step 512. If step 510 is performed, then step 512 need not be performed.

The middleware 204 is executed and the middleware 204 maps the data in step 514. Mapping 514 is the step, method, or process that the middleware 204 performs in order to transform original application UI data into standard user interface data. When the middleware 204 maps the original UI 254 into the standard UI 242, information or data is taken from the original user interface 254 and is reconfigured to create the standard user interface 242 displayed to the user. The middleware 204 can perform the mapping step 514 at different levels: operation mapping, where an operation in one interface is bound to an operation in another interface; and parameter mappings, where a parameter in one interface is bound to a parameter in another interface. Mapping 514 is further described in conjunction with FIGS. 6A and 6B.

Once the middleware 204 has mapped the data 514, the middleware 204 sends the mapped data to the UI 202 in the correct configuration, in step 516. Once the UI 202 receives the correctly configured application UI data, the UI 202 can render the mapped data to the user in the standardized UI format, in step 518. In step 518, the UI 202 displays the data in the standard UI to the user. Upon completion of step 518, the user should be able to view and interact with the data using the user interface 202. Furthermore, the UI 202 displayed to the user should look like the standard UI 242.

Figure 6A:
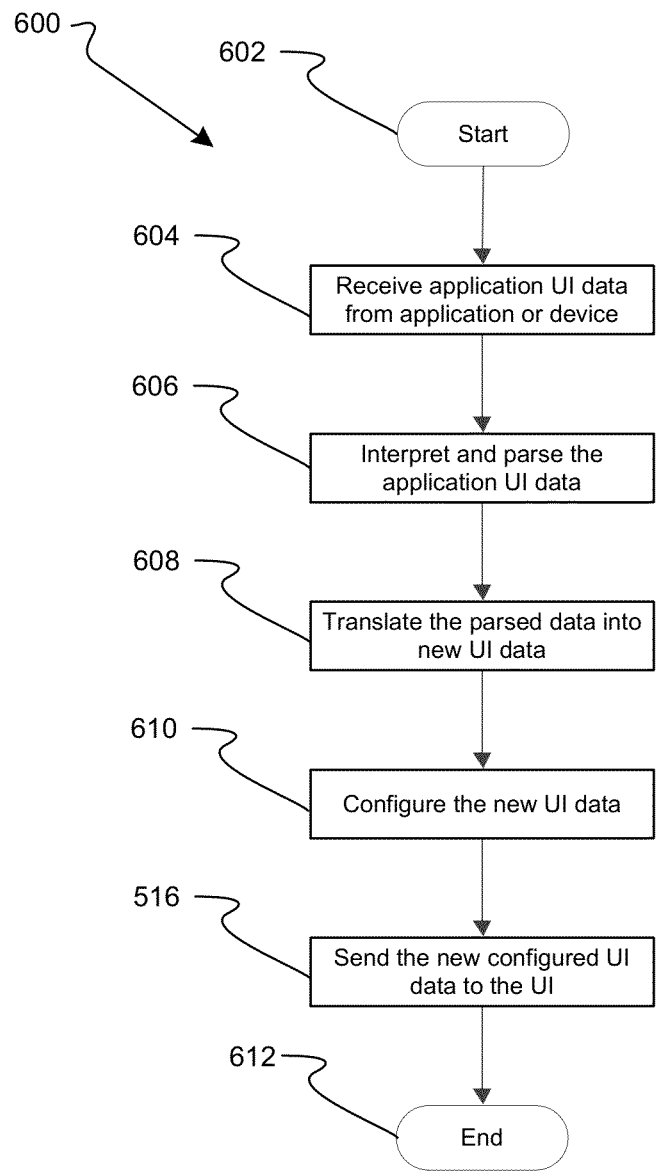
FIGS. 6A and 6B are flow diagrams of embodiments of processes for mapping a user interface.

An embodiment of a method 600 for mapping data, as shown in step 514 of FIG. 5 and as performed by the middleware 204, is shown in FIG. 6A. A general order for the steps of the method 600 is shown in FIG. 6A. Generally, the method 600 starts with a start operation 602 and ends with an end operation 612. The method 600 can include more or fewer steps and/or arrange the order of the steps differently than those shown in FIG. 6A. The method 600 can be executed as a set of computer-executable instructions executed by a computer system and encoded or stored on a computer readable medium. Hereinafter, the method 600 shall be explained with reference to the systems, components, modules, software, data structures, user interfaces, etc. described in conjunction with FIGS. 1-4d.

In step 604, the middleware 204 receives the application UI data from an application 210, from a database on a user device 102, or from any other source.

Upon receiving the application UI data 300, the middleware 204 interprets and parses 250 the data 300, in step 606. In embodiments, interpretation can mean determining the type of data received, such as determining whether the data 300 is an application user interface data and, if so, whether the data 300 contains contact information, email information, product order information, etc. The middleware 204 can interpret the application UI data 300 by looking at the header 302 of the data 300. The middleware 204 can also determine whether the data 300 contains a region ID 316 or 322, a UI device ID 318, and/or a field 324. In another embodiment, the middleware 204 interprets the application UI data 300 by looking at the information contained in the data section 304, 314, or 320 of the application UI data 300.

Once the middleware 204 interprets the application UI data 300, the middleware 204 can also parse the data 300, in step 606. Parsing the data 300 can involve separating the data 300 into its portions 314, 316, 318, 320, 322, and 324. The portions 314, 316, 318, 320, 322, and/or 324 may include the data segment 314, the UI field 324, 414, or 416, the UI device ID 318, the region ID 316, and/or The middleware 204 translates the parsed data into standard UI, in step 608. Step 608 is further discussed below in conjunction with FIG. 6B.

The middleware 204 configures the translated data, in step 610. The configuration step 610 may include reassembling the data into a format that is acceptable to the user interface 202 on the user device 102. The acceptable format will depend on the UI 202 and the user device 102. Additionally, the configuration will depend on the standard user interface. The middleware 204 may use a template map 312 or 332 to configure the data in the correct order and format. The data must be configured such that the UI 202 will properly display the data in the standard UI format.

The middleware 204 sends the configured data to the UI, in step 516. At this point, the middleware 204 has finished mapping the application UI data 300. Once the UI receives the configured data, the UI can display the data to the user in the form of the standard user interface, in step 518.

Figure 6B:
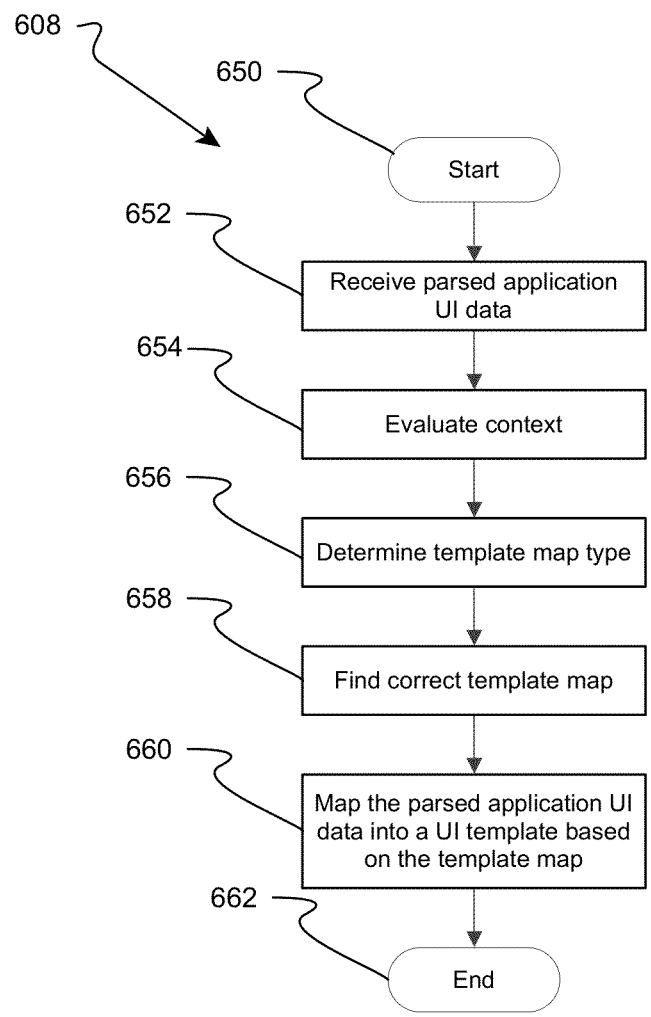

An embodiment of a method 608 for translating data, step 608 in FIG. 6A and as performed by the middleware 204, is shown in FIG. 6B. A general order for the steps of the method 608 is shown in FIG. 6B. Generally, the method 608 starts with a start operation 650 and ends with an end operation 662. The method 608 can include more or fewer steps or arrange the order of the steps differently than those shown in FIG. 6B. The method 608 can be executed as a set of computer-executable instructions executed by a computer system and encoded or stored on a computer readable medium. Hereinafter, the method 608 shall be explained with reference to the systems, components, modules, software, data structures, user interfaces, etc. described in conjunction with FIGS. 1-6A.

The middleware 204 may, after interpreting and parsing the application UI data 300, in step 606, receive the parsed data, in step 652. The middleware 204 can evaluate the context of the data, in step 654. The context evaluation may be based on a device state, an application state, a different application's state, and/or other factors. Factors that may be considered when evaluating the device state include the application currently being executed by the processor, other applications being executed by the processor, and other information from other applications, such as the date and time. The device state may allow the middleware 204 to determine whether the user is currently using the user device 102 for work or personal reasons. The application state may include the processes within the application 210 that are currently being executed. The application state may also include whether the application 210 is receiving input from the user or requesting data from a database or other source of data.

Based on the context and/or the interpretation of the application UI data 300, the middleware determines the template map type, in step 656. A template map type may be a contact template map, a product template map, an order template map, or any other type of template map. Two or more applications may use the same template map type.

In step 658, which may be based on the template map type determined in step 656, the middleware can determine which template map 312 or 332 is the correct template map 312 or 332 for the specific application 210 and/or the context determined in step 654. If there is only one template map 312 or 332 for the chosen template map type, then step 658 will not need to be performed because once the template map type is determined, the template map is known.

Upon the middleware determining the correct template map 312 or 332 in step 658, the middleware selects the template map 312 or 332 from the template mapping database 310. In step 660, the middleware can map the parsed data received in step 652, into a standard UI template 202a based on the selected template map 312 or 332. The standard UI template 202a may be a standard UI template chosen by the user. In step 660, the middleware takes each portion of the parsed data and puts that portion into the correct location in the template map 312 or 332. The template map 312 and 332 contains instructions telling the middleware how to map the application UI data into the standard UI by instructing the middleware to put the various portions of the parsed data into various locations in the template map. For example, Region 1 of the original UI may correlate to Region 3 in the standard UI. Therefore, the template map will instruct the middleware to give certain data from the original Region 1 a region ID correlating to Region 3 of the standard UI.

FIG. 7 illustrates a block diagram of a computing environment 700 wherein the systems, devices, servers, software modules, etc. may execute. As such, the system or components described in conjunction with FIG. 7 may be commodity hardware. The computing environment 700 includes one or more user computers 705, 710, and 715 (also called user devices herein). The user computers 705, 710, and 715 may be general-purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, computing tablet, and/or personal digital assistant, capable of communicating via a network (e.g., the network 720 described below) and/or displaying and navigating web pages or other types of electronic documents. Although the exemplary computing environment 700 is shown with three user computers, any number of user computers may be supported.

Computing environment 700 further includes a network 720. The network 720 can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks. The network 720 may be the same or similar to network 104.

The system may also include one or more server computers 725, 730. One server may be a web server 725, which may be used to process requests for web pages or other electronic documents from user computers 705, 710, and 720. The web server can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The computing environment 700 may also include one or more file and or/application servers 730, which can, in addition to an operating system, include one or more applications accessible by a client running on one or more of the user computers 705, 710, 715. The server(s) 730 may be one or more general-purpose computers capable of executing programs or scripts in response to the user computers 705, 710 and 715. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as the active host 102 and/or the standby host 104.

The computing environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands.

FIG. 8 illustrates one embodiment of a computer system 800 upon which the systems, devices, servers, software modules, etc. described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 720 and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments n have been described in detail herein, it is to be understood that the concepts may be otherwise variously embodied and employed, and that the appended claims are intended to be construed to include such variations, except as limited by the prior art.

What is claimed is:

1. A computer program product including computer executable instructions stored onto a non-transitory computer readable medium which, when executed by a processor of a computer, causes the computer to perform a method for standardizing a user interface on a device, the instructions comprising:
   instructions to receive data associated with a user interface for an application, wherein at least a portion of the received data associated with the user interface for the application is designated for display in a first region of the user interface for the application;
   instructions to interpret the received data;
   instructions to parse the interpreted data;
   instructions to translate the parsed data, wherein the translation comprises:
      instructions to determine a context of the interpreted data;
      instructions to determine a template map type based on the determined context, wherein the template map type comprises at least one of: a contact template map, a product template map, and an order template map;
      based on the interpretation of the received and the template map type, instructions to determine one of two or more template maps that are associated with the application;
      instructions to retrieve the one of two or more template maps; and
      instructions to map the parsed data to a standard user interface based on the retrieved one of two or more template maps, wherein the at least a portion of the data associated with the user interface for the application designated for display in the first region of the user interface for the application is mapped to a second region in the standard user interface; and
   instructions to configure the standard user interface with the mapped data.

2. The computer program product as defined in claim 1, wherein the instructions include instructions to send the configured standard user interface to a display.

3. The computer program product as defined in claim 1, wherein the determined context is based on at least one of a device state or application state.

4. The computer program product as defined in claim 3, wherein the determined context is based on the device state and wherein the device state is one of: a user using the device for work and the user using the device for personal reasons.

5. The computer program product as defined in claim 1, wherein two or more applications have user interfaces changes to the standard user interface.

6. The computer program product as defined in claim 1, wherein the computer program product receives second data for a second user interface from a second application and wherein the computer program product further comprises instructions to translate the second data into the standard user interface based on a second template map.

7. The computer program product as defined in claim 6, wherein the second template map is different from the one template map.

8. The computer program product as defined in claim 1, wherein a user can select and modify the one template map.

9. The computer program product as defined in claim 1, further comprising the two or more template maps.

10. The computer program product as defined in claim 9, the instructions further comprising:
    instructions to determine an individual template map type based on the interpretation of the parsed data.

11. The computer program product as defined in claim 1, wherein the received data is associated with at least one of a first database associated with the application, a second database associated with the device, a third database associated with an external server, a fourth database associated with a network, or any other database with which the application is in communication.

12. The computer program product as defined in claim 1, wherein the one template map defines a location for a user interface device or a field in the standard user interface.

13. The computer program product as defined in claim 12, wherein the instructions to map the parsed data comprise instructions to map the parsed data with the user interface device and instructions to map the parsed data with the field.

14. The computer program product as defined in claim 1, wherein the second region is mapped by following settings by a user.

15. A user device, comprising:
    a user interface on the user device in communication with a processor, the user interface on the user device operable to:
       receive data from at least one of an application or a middleware, wherein at least a portion of the received data from the at least one of the application or middleware is in a first region of a user interface for the application;
       provide application information to a user; and
       receive a signal from the user;
    a memory; and
    the processor in communication with the memory and the user interface of the user device, the processor operable to receive the data directed to the user interface of the user device, the processor operable to execute one or more modules, the one or more modules comprising:
       the middleware operable to receive the data from the application, interpret the received data, parse the interpreted data, translate the parsed data into a standard user interface based on a template map, determine a context of the translated data, determine a template map type based on the determined context, wherein the template map type comprises at least one of: a contact template map, a product template map, and an order template map, wherein the template map is determined based on the interpretation of the received data and the template map type, and wherein the at least a portion of the received data from the at least one of the application or middleware is mapped to a second region in the standard user interface; and
       the application operable to send the received data to the middleware.

16. A method for providing a standard user interface on a device, comprising:
    a processor receiving data associated with a user interface, the data received in a request to execute an application;
    the processor executing middleware;
    the middleware receiving the data received in the request to execute the application;
    the middleware interpreting the data received in the request to execute the application;
    the middleware parsing the interpreted data;

the middleware determining a context of the received data associated with the user interface;

the middleware determining a template map type for the application based on the context of the received data associated with the user interface, wherein the template map type comprises at least one of: a contact template map, a product template map, and an order template map;

the middleware determining a template map based on the interpretation of the received data and the template map type;

the middleware mapping the parsed data into a standard user interface based on the-template map;

the user interface display receiving the standard user interface; and the user interface display displaying the standard user interface.

17. The method as defined in claim 16, further comprising:
the middleware translating the parsed data; and
the middleware configuring the translated data.

18. The method as defined in claim 16, wherein the context is based on one of a device state and application state.

\* \* \* \* \*